July 9, 1946.    P. MAINARDI ET AL    2,403,733
STEREOSCOPIC OPTICAL SYSTEM
Filed May 22, 1941    5 Sheets-Sheet 1
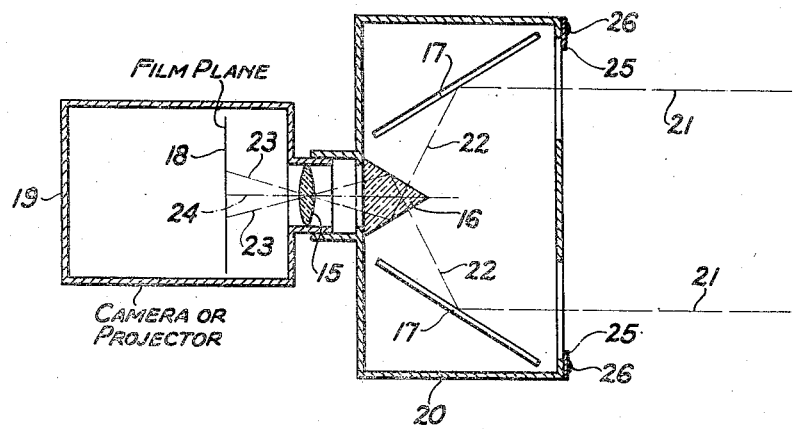
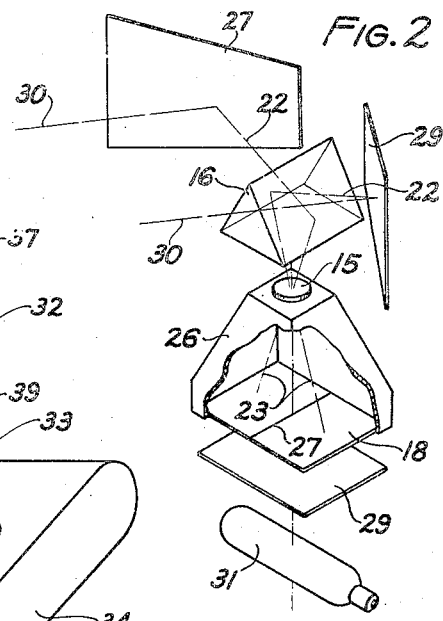
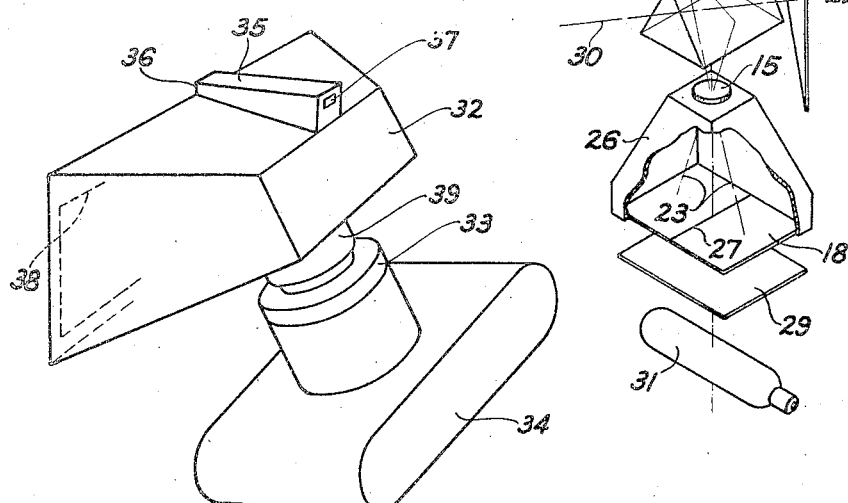
POMPEY MAINARDI
MARCUS N. MAINARDI
INVENTORS
BY *[signature]*
ATTORNEY

POMPEY MAINARDI
MARCUS N. MAINARDI
INVENTORS

BY Newton M. Pernido
ATTORNEY

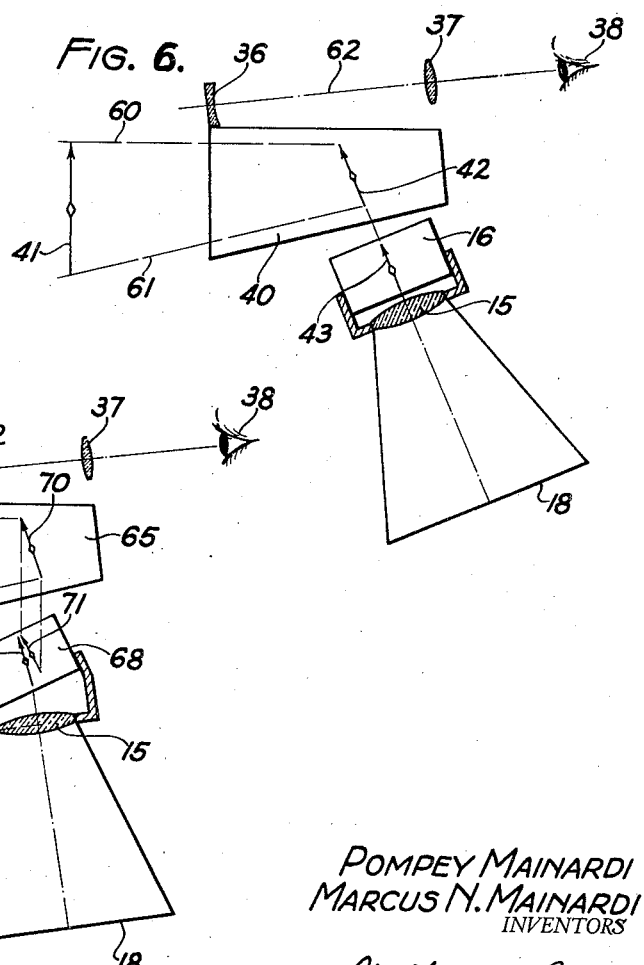

July 9, 1946.  P. MAINARDI ET AL  2,403,733
STEREOSCOPIC OPTICAL SYSTEM
Filed May 22, 1941  5 Sheets-Sheet 4
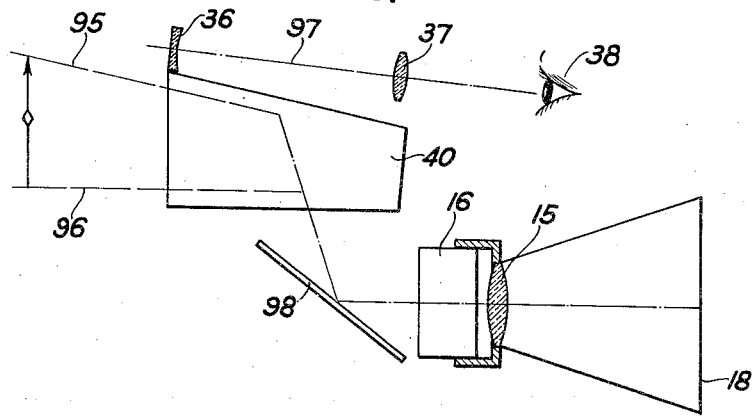
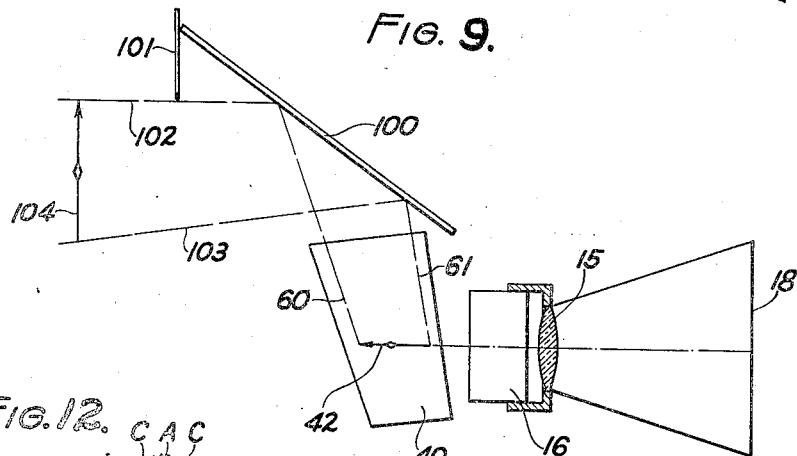
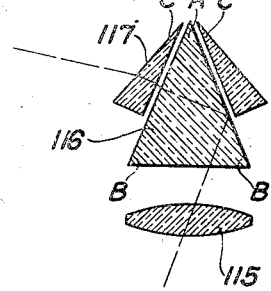
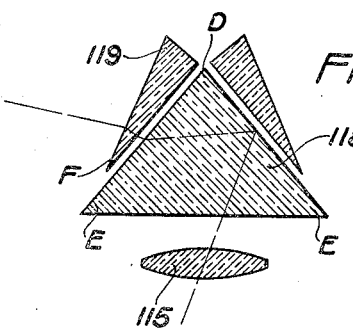
POMPEY MAINARDI
MARCUS N. MAINARDI
INVENTORS
BY *Newton M. Perrus*
ATTORNEY

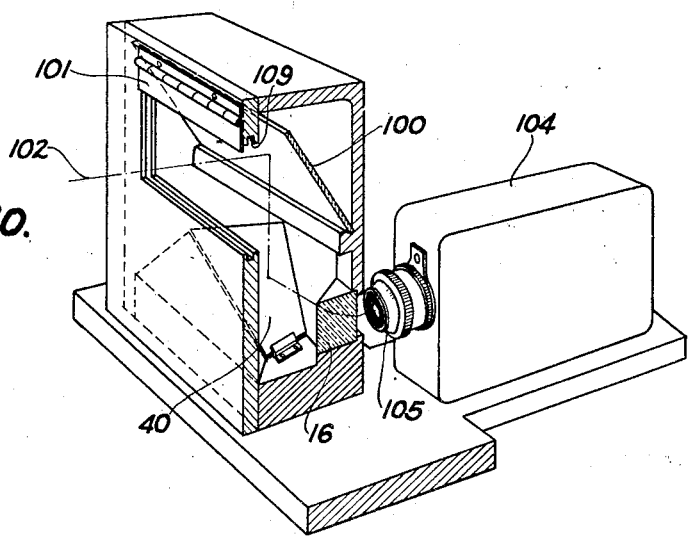
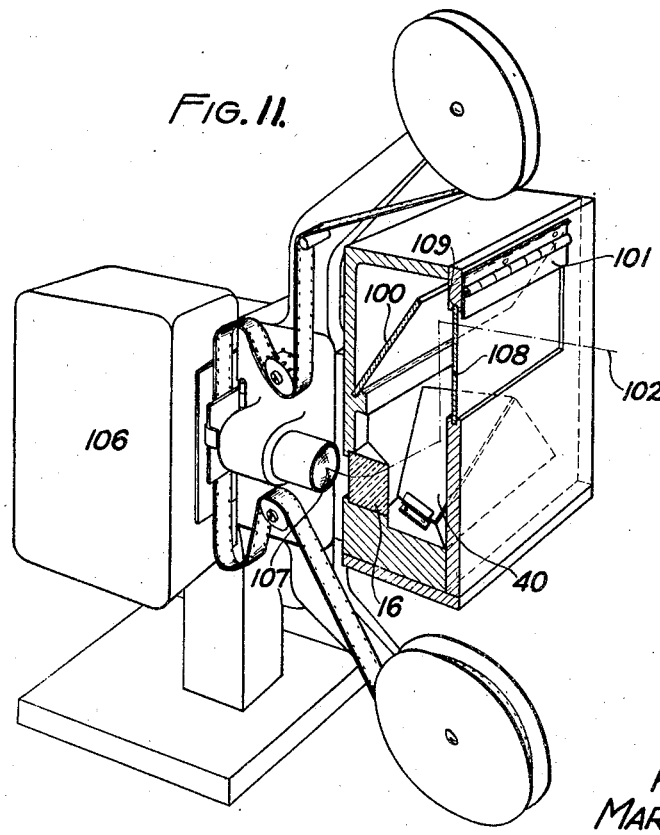

Patented July 9, 1946

2,403,733

UNITED STATES PATENT OFFICE 2,403,733

STEREOSCOPIC OPTICAL SYSTEM

Pompey Mainardi and Marcus N. Mainardi,
Paterson, N. J.

Application May 22, 1941, Serial No. 394,676

14 Claims. (Cl. 88—16.6)

This invention relates to stereoscopic optical systems and particularly to a system for taking or projecting stereo pictures. It is also useful in any optical system involving the projection of two pictures from a single frame or two adjacent frames.

It is an object of the invention to provide a stereoscopic system employing a single objective lens for projecting from or taking stereoscopic pictures adjacent to one another on a film or plate.

It is the main object of the invention to provide such a system which utilizes the objective lens efficiently.

It is an object of the invention to provide such a system which is compact and which is optically accurate and simple in design.

It is an object of one embodiment of the invention to provide a stereoscopic attachment which can be used with an ordinary camera or projector to provide the above-listed objects. One form of this attachment employing an adjustable mask can be used with lenses of different apertures or other lens characteristics.

It is a particular object of the invention to provide a system for projecting from or taking stereoscopic pictures which are oppositiaxially oriented on the film. That is, the pictures are arranged head to head or foot to foot. When both pictures are taken on a single frame of either still or motion pictures, this embodiment provides that the width of each picture in general will be greater than the height.

It is an important object of this embodiment to eliminate keystone distortion entirely or at least to make it identical in both of the stereo pictures so that no disturbing effect appears to the one viewing the stereo.

It is an object of one embodiment of the invention to provide an attachment which can be used either on a camera or on a projector so that someone owning a movie camera and a movie projector need only purchase one attachment.

Since most projectors have the lens horizontal and since it is desirable always to have the projector lamp upright, it is an object of the invention to provide an attachment for projecting from a horizontal objective to a vertical screen. Two alternative forms of the present invention are available to provide this last object. One of these has the advantage that it is simpler, but it requires a mask or the equivalent to be placed adjacent to the screen itself and the light distribution in the images at the screen is not entirely uniform. The other arrangement overcomes these minor difficulties and also has the advantage of being useful both in taking and projecting.

In any stereoscopic system, means must be included for preventing the left eye from seeing the picture intended for the right eye and vice versa. Complimentary light filters in the two light paths are commonly used for this purpose. They may be complementary polarizing filters, for example plane polarizing filters with their vibration axes mutually perpendicular, or they may be differently colored color filters. It is an object of one embodiment of the invention to provide a stereoscopic system or attachment with means for holding such complementary light filters when the system is used for projecting. Of course similar filters are worn over the eyes of the observer.

The main fault with prior systems is that they reduce the effective aperture of the lens to less than half. Attempts to overcome this by placing the mirrors of such systems a great distance in front of the lens results in an unwieldy arrangement. Two faults of importance were the presence of keystone distortion and the fact that pictures were higher than they were wide.

According to the present invention these difficulties are overcome and many other advantages gained by positioning an isosceles prism (preferably an equilateral prism) in front of the objective lens of a camera or projector, with the base face of the prism adjacent to the lens. The base face of the prism is placed either flat on the front of the lens, i. e. parallel to the principal planes of the lens or tipped at an acute angle thereto as discussed in our copending application, Serial Number 394,677 filed concurrently herewith now U. S. Patent 2,313,561.

Since in any system of plane mirrors or other reflectors, light paths can be considered as going in either direction (the well-known law of the reversibility of the path of light), we shall consider the light as traveling in whichever direction is most convenient. In a camera the light travels through the lens to the sensitive film and in a projector it travels from the film outward through the lens. The side faces of the prism receive light through the base and crossingly through the lens, and reflect this light respectively through the other two side faces. By having the prism equilateral, or approximately equilateral, the color fringing due to any refraction effects is minimized.

On each side of the prism is positioned a reflector which may be either a mirror or a prism to receive the light beam through the adjacent side face of the prism and to reflect it into stereoscopic coincidence at the front focus of the lens.

The term "stereoscopic coincidence" is here used to have a generic but definite meaning. In the case of a projector it refers to the approximate superposition of the images on the screen. Obviously, stereoscopic images differ from one another and hence cannot be superimposed in perfect register. Therefore in this case "stereoscopic coincidence" refers to the fact that these two images are substantially in the same region of the screen. Of course, since there must be some distinguishing means so that the right eye sees only the right-eye image and is prevented from seeing the left-eye image, there is no point in matching these two images even at a single point, but they must be generally close together to prevent eye-strain. In the case of a camera, the scene being photographed is of course a scene in depth and the term "stereoscopic coincidence" refers to the fact that the origins of the light beams coincide exactly, throughout the depth of the picture and at each object involved in the scene. The optical system employed is the same or substantially the same in both cases, the two images being adjacent to one another at the film plane or back focus plane of the lens and being in "stereoscopic coincidence" at the front focus plane of the lens which is either the projector screen or the scene being photographed.

Since films are the commonest form of photographic mediums now used, the term is here used to describe the invention, but obviously plates would be equally satisfactory and the term film is used to cover such embodiments.

It will be noted that the light beam traveling between one of the outer reflectors and the film plane utilizes the whole of the lens aperture for some points of the image and at least half of the aperture for every point. In fact it is the points near the optic axis of the lens that utilize the lens least efficiently which means that there is a tendency to compensate the lack of uniformity due to falling off of light intensity at the edges of the lens field. Prior systems using two mirrors intersecting immediately in front of the lenses had a theoretical maximum efficiency of one-half the lens aperture whereas the present arrangement is for all practical purposes equivalent to full aperture. Theoretically there is the slight diminution from full aperture near the optic axis of this system, but in practice the effect is negligible even with color films wherein the exposure is most critical.

When the present invention is used for taking pictures, it is customary to have the two outer reflectors spaced from one another at normal interocular separation, i. e. the normal distance between the human eyes. In order to get special effects such as accentuated stereo, the separation of these reflectors may be greater than the normal interocular distance. On the other hand, the separation of the reflectors is not critical in the case of projection systems.

Since most pictures are to be viewed with the head upright, it is generally desirable to have the outer reflectors spaced from another in a horizontal plane, in the embodiments of the invention applied to the taking of pictures. In the case of projection, it is not necessary to have these reflectors in the same horizontal plane. In every case however, the whole system is symmetrical about the optic axis of the lens which therefore passes through the apex of the prism.

If the system is focused on infinity, rays from or to corresponding points on the two stereoscopic pictures emerge from or strike the two outer reflectors parallel; to converge at closer distances the two outer reflectors are toed in. Of course, the total beam covering the whole of the scene being photographed or of the image on the projection screen, converges toward each of the outer reflectors.

When this invention is applied, in a less preferred embodiment with two direct systems in which the adjacent stereoscopic pictures are similarly oriented on the film, the prism is in general placed with its base face parallel to the principal planes of the lens and the outer reflectors are arranged so that a portion of each ray between the subject and the reflector is substantially parallel to the portion of the same ray between the prism and the lens. The terms horizontal, vertical, top, bottom, front and rear are here used relative to one another and do not necessarily refer to any particular orientation in space. If the optic axis of the lens is considered to be horizontal, the apex of the prism is vertical and each of the outer reflectors is vertical in this particular embodiment. Such a system has the advantage common to the other embodiments of the invention of utilizing the lens aperture efficiently.

One disadvantage of such systems is the fact that the line of division between the stereoscopic pictures on the film divide the film frame so that each of the pictures is higher than it is wide. This is a disadvantage for the majority of scenes.

Another disadvantage of such a direct system, which is easily apparent in practice, is most easily experienced by considering the position of the optic axis of the lens. Since the pictures on the film are similarly oriented, the optic axis of the lens necessarily corresponds to one edge of one of the pictures and the opposite edge of the other picture. This means that the rays traveling from each of the reflectors and corresponding to the optic axis of the lens go to opposite edges of the scene being photographed or of the image on the screen. Since these rays do not strike the scene or screen perpendicularly, each optical system is effectively tilted with respect to the subject. This introduces the same type of distortion as occurs when one photographs a high building by pointing a camera upward. The image plane or back focus plane of the camera is not parallel to the plane of the object. The resulting keystone distortion in each picture would perhaps not be too objectionable if it were not for the fact that it is in the opposite direction in the two pictures. Thus any attempt to orient the system so that the optic axis from one of the outer reflectors is perpendicular to the scene or screen results in the optic axis from the other reflector being at even a greater angle to the normal. When viewing stereoscopic pictures taken or projected with such an arrangement, the two different distortions make it difficult to fuse the pictures stereoscopically in the brain, hence introduce considerable eye-strain.

Any stereoscopic system which provides that the pictures on the film are oppositiaxially arranged, i. e. head to head or foot to foot, insures that the optic axis of the lens corresponds to the same point of the scene in both pictures. For example, if the pictures are head to head the optic axis of the lens passes through the center of the top of each scene. Therefore, with such a system, used on a camera or projector, it should be pointed so that a scene or screen is in a plane orthogonal to the optic axis passing through the top center thereof. This means that the camera should photograph only subjects below the horizontal plane of the camera. By turning the camera over, the pictures would be foot to foot and could all lie above the horizontal plane. Such an arrangement would result in complete elimination of keystone distortion.

However, even if one were to tip the optical ssytem so that the optic axis did not strike the scene or screen perpendicularly, the resulting keystone distortion would be the same in both scenes and would also be the same as the simple effect produced when one photographs with an ordinary camera tilted. Since the keystoning would be identical in the two pictures, no eye strain would be introduced in viewing such a picture.

The converting of images in stereoscopic coincidence (an original scene or superposed images on a screen) into stereoscopic pictures adjacent to one another and oppositiaxially oriented on a film, requires that the two beams be rotated through 90° in the opposite direction to one another or rotated in some equivalent way. It is well known that such rotation may be accomplished by two reflectors. For example, a horizontal beam striking one reflector and being reflected at 90° in a horizontal plane and striking a second reflector which sends it vertically upward will rotate the beam to 90°. However, there are a large number of mirror orientations which will produce this rotation and in fact a light beam coming from any reflecting surface can be so rotated with respect to the incident beam, by proper orientation of a second mirror. Considering the general case for two inner reflectors (the side faces of the prism) and two outer reflectors, it is possible to have an infinite number of different orientations of the two systems which will convert images in stereoscopic coincidence to adjacent images oppositiaxially oriented in the back focus plane of the lens. In the case of a prism, the angle between the two inner reflectors is fixed, but there are still an infinite number of solutions to the mathematical problem presented by the two mirror systems for obtaining the 90° rotation of the beams. If, however, the base face of the prism is parallel to the principal planes of the lens or at some fixed angle thereto, the relative orientations of the two outer reflectors are fixed and the only degree of freedom remaining permits the whole system to be tipped relative to the beam or screen so that the optic axis is perpendicular thereto or at some specified angle. Obviously, the fact that the beams from the two outer mirrors must go into stereoscopic coincidence at the front focus plane of the lens places one limitation on the orientation of these mirrors when the system is symmetrical about the optic axis of the lens.

If the system is made up of an ordinary camera or projector with an attachment, such attachment cooperates with the lens of the camera or projector to utilize its aperture efficiently. Such an attachment would include a housing with a window, either an opening or a glass window, to admit light from the subject to the outer reflectors and a second window to allow the light to pass between the base face of the prism and the camera or projector lens. In general, the window between the outer reflectors and the subject or screen is referred to as the front window and the second window may be either in the rear wall, for example as in the direct system mentioned above, or may be in the top or bottom wall, which is generally at a slight angle to the horizontal.

If the prism is placed with its base face parallel to the principal planes of the lens, a smaller prism may be used and still optically cover the whole of the lens. On the other hand, a slight tipping of the prism permits some advantages, as discussed in full in our copending application, Serial Number 394,677, now Patent 2,313,561, mentioned above.

In the preferred embodiments of the invention, each half of the system acts entirely independently and to prevent the two beams from overlapping at the back focus plane of the lens, a mask is provided in front of the two outer reflectors to cut off that portion of each beam which would so overlap the other beam.

For various reasons, it is sometimes desirable to have an additional mirror somewhere between the lens and the front focus plane thereof. The main advantage is the elimination of the need for tipping the prism and the fact that it is possible to hold the optic axis of the lens horizontal while taking or projecting horizontally. This additional mirror may be between the lens and the prism or between the prism and the outer mirrors, but is preferably between the outer mirrors and the subject or screen in the front focus plane of the lens. The preferred embodiment of the invention has an attachment including such a mirror in front of the outer reflectors and is arranged so that it may be attached to either a camera or a projector. The mask to prevent overlapping of the beams at the back focus plane of the lens, may conveniently be placed in front of this large mirror. Whatever position the mask takes, it is preferable to have the mask adjustable since the degree of overlap of the beams, depends on the aperture of the lens being used and in some embodiments on the covering power of the lens. This adjustable feature is particularly attractive in the case of an attachment intended for use alternatively on a camera and a projector since the lenses are in general quite different on the two instruments.

In the projection of stereoscopic pictures, it is necessary to provide some means of distinguishing between the images and this is most conveniently done by placing complementary light filters such as complementary color filters or complementary polarizing filters respectively in the two beams in some position where they do not affect the wrong beam. That is, the filters must be positioned between the prism and the outer reflectors or between the outer reflectors and the plane immediately in front of these reflectors whereat the two beams begin to overlap. In the case of an interchangeable attachment for use on a motion picture camera and on a projector having a two-inch lens and having an additional mirror in front of the outer reflectors, we have found that the plane at whicch the beams begin to overlap is in front of the additional reflector and hence the grooves for holding the filters when the attachment is used for projection, are in front of the additional mirror. As pointed out above, it is more convenient in describing an optical system of this type, to consider the light coming from one of the elements to another element and being reflected thereby. Therefore, this common procedure is used in this specification and the accompanying claims. However, the light may actually pass in the exactly opposite direction to that being described. For example, no light beams come from the back focus plane of a camera through the lens to the prism and out to the outer reflectors, but the orientation and arrangement of the various reflectors, may easily be described by reference to such light beams.

The invention and the various objects and advantages thereof may be more fully understood by the following description of various embodiments thereof when read in connection with the accompanying drawings in which:

Fig. 1 shows an embodiment of the invention in a direct system.

Fig. 2 shows an embodiment of the invention involving stereo pictures head to head.

Fig. 3 is an outside view of a camera attachment incorporating the invention.

Figure 5:
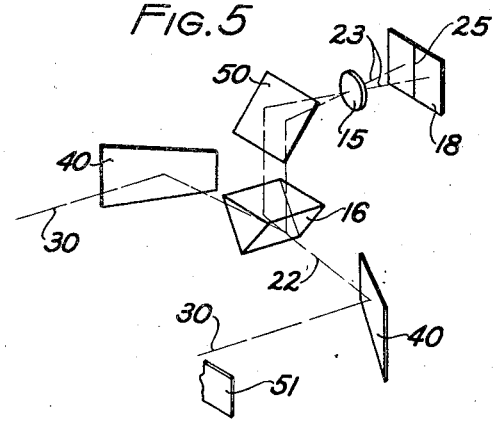

Fig. 5 similarly shows the elements of the invention including an additional mirror.

Fig. 6 is an elevation partly in cross section of one embodiment of the invention.

Fig. 7 is a similar view of a different embodiment of the invention.

Figs. 8 and 9 are similar to Figs. 7 and 8 and show embodiments of the invention involving an additional mirror.

Figs. 10 and 11 illustrate an attachment incorporating the invention which is useful on either a camera or a projector.

Figs. 12 and 13 illustrate methods of eliminating color fringing, when using isosceles prisms which are not equilateral.

In Fig. 1 there is shown a camera or projector for either still or motion pictures having a lens 15, the usual housing 19, means (not shown in this figure) for holding film in the film plane 18 and a stereoscopic attachment mounted on the lens. The attachment includes a housing 20 having a rear window and a front window or windows through which light may be admitted from the subject or transmitted to a screen. Over the rear window and in alignment with the lens 15, when the attachment is attached thereto, is an isosceles prism 16, preferably an equilateral prism. Light from the back focus plane 18 of the lens 15 shown by rays 23 crosses in the lens 15, passes through the base face of the prism 16 and is reflected by the side faces of this prism through the opposite side faces back across the optic axis 24 of the lens 15. In this embodiment, the base face of the prism 16 is parallel to the principal planes of the lens 15. The beams passing through the side faces of the prism 16 strike mirrors 17 as shown by the rays 22 and are reflected as shown by the rays 21 substantially parallel and forward. Actually they are reflected into stereoscopic coincidence as described above. In order to prevent any overlap of the beams at the film plane 18, masks 25 are provided to cut off those portions of each scene which would so overlap. By means of slots, not shown, and screws 26 therein, the position of the masks 25 is adjustable to correspond to lenses of different covering power or different aperture.

In Fig. 2 the optical system for projecting from or taking stereoscopic pictures adjacent to one another and oppositiaxially oriented on the film is shown. In this particular figure, the optical system is shown in connection with a projector, in which the film 18 having a dividing line 27 between the pictures is positioned more or less horizontally and is illuminated by a lamp 31 through a diffusing medium 29. In this case the rays 23 passing through the lens 15 to the prism 16 are reflected as shown by rays 22 to the two outer reflectors 27 and 29 which are oriented to rotate the beams through 90° in opposite directions and to project them as shown by rays 30 into stereoscopic coincidence at the front focus of the lens 15.

Fig. 3 shows a simple embodiment of the invention in the form of an attachment to be used on an ordinary camera 34 having a lens barrel 33. The attachment 32 is attached to the lens barrel 33 by a sleeve 39. The front window of the attachment is shown by broken lines 38. The view finder 35 of the system is centrally located on the top of the housing with a front lens 36 and an eyepiece 37. The optic axis of this finder is parallel to the rays from the center of the scene being photographed, which are definitely not parallel to the rays corresponding to the optic axis of the lens of the camera, as pointed out in detail below. With this particular arrangement, the optic axis of the camera lens corresponds to rays coming from the midpoint of the top of the scene being photographed.

Figure 4:
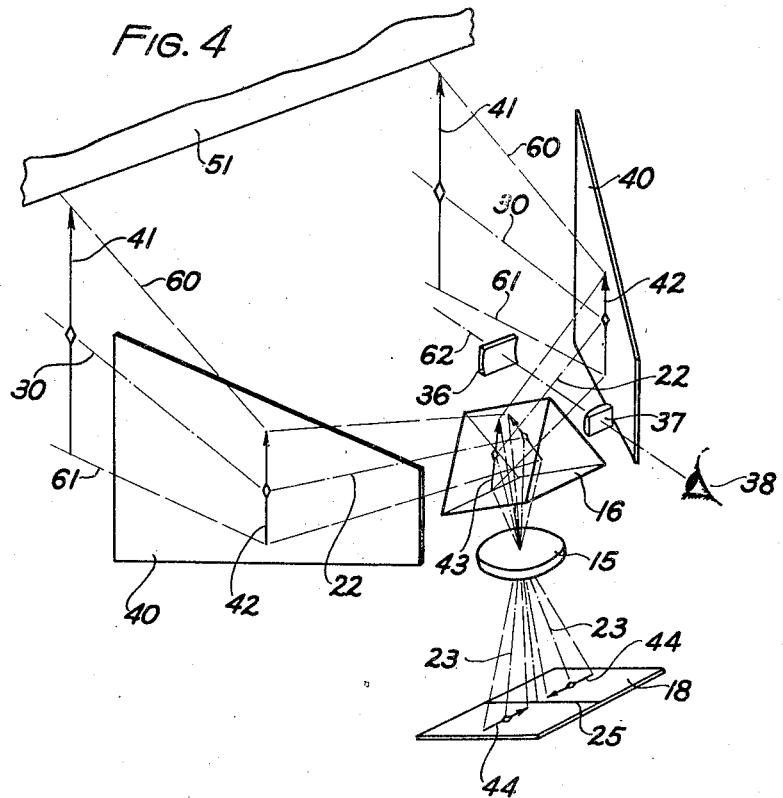
Fig. 4 is a perspective drawing of the elements of the invention when used for taking stereo pictures.

The whole arrangement is perhaps best visualized from Fig. 4 which, with the exception of the view finder consisting of lenses 36 and 37 having an optic axis 62 passing through the eye 38 of the observer, is the same for both camera and projector systems. For convenience, the optical system will first be described as in connection with a projector. The film plane 18 containing oppositiaxially oriented images 44 separated by the dividing line 25 is tipped slightly to the horizontal. The beams from the images are shown by rays 23 crossing in the lens 15 and passing through the base face of a prism 16, which base face is parallel to the principal planes of the lens. These beams strike the side faces of the prism and are reflected respectively through the opposite side face. To show the orientation of the beam, arrows 43 are drawn on the side faces, but obviously no real images are formed at this point. By reflection from these side faces through the opposite side faces, (the arrows at the side faces during exit are not shown in this figure) the rays travel by beams 22 to the outer mirrors 40.

Again the orientation of the beams is shown by arrows 42 and the mirrors 40 are so oriented that the beams travel forward into stereoscopic coincidence at the front focus plane of the lens 15. The orientation of the beams 30 as they so pass forward is indicated by arrows 41. It will be noted that the arrows 41 are both upright and similarly oriented and hence the beams have suffered rotation in opposite directions through 90°. It is a relatively simple matter to orient the mirrors 40 to give this effect and to have the rays 30 traveling forward in the same plane. Since the top of the arrow in the images 41 is immediately adjacent to the optic axis of the lens 15, the top rays 60 of the outgoing beams correspond to the optic axis. The lower rays 61 of these beams correspond to the edges of the frames in the film plane 18. To insure that none of the left-hand image on the plane 18 is projected from the right-hand mirror 40, a mask 51 is placed in front of the mirrors 40 to mask out any portions of the beams above the rays 60.

When this apparatus is used in taking pictures, the mask 51 prevents light from reaching the sensitive film 18 which would overlap the images. Obviously, the optic axis 62 of the view finder should be substantially parallel to the mid rays 30 of the incoming beams. If the whole system is tilted so that the rays 60 are horizontal and the camera only photographs a scene below the horizontal, there will be no keystone distortion in the images 44. Furthermore, even if the whole system were tilted upward, for example, so that the optic axis 60 does not strike the scene perpendicularly, the keystone distortion introduced into the pictures will be identical in the two pictures and will not introduce eye strain when the pictures are viewed directly in a stereoscope.

In Fig. 5 an additional mirror 50 is positioned between the prism 16 and the lens 15 so that any desired orientation of the lens 15 in space is obtainable. For example, it may be desirable to have the optic axis of the lens 15 horizontal, as in the case of a projector and to have the rays 30 also substantially horizontal.

Referring back to Fig. 4, when the base face of the prism 16 is parallel to the principal planes of the lens 15, and the rays 60 are considered to be horizontal, the optic axis of the lens 15 is based at a 30-degree angle to the vertical. Obviously, this involves a tilting forward of the mirrors 40 to give the correct orientation and rotation of the beams 30. In practice it is a very simple matter to orient the mirrors 40 so as to give the proper rotation to the beams, as is well known to anyone who has manipulated two mirrors for this purpose. Because of the three dimensions involved, it is not easy to describe these orientations mathematically.

Fig. 6 shows a side elevation of the camera system corresponding to Figs. 3 and 4, partly in section. This particular figure is included since it illustrates clearly the orientation of the beams as represented by arrows 42 and 43. When the prism 16 is equilateral, the reflection at one of the side faces makes the optical effect of the prism equivalent to that of a plano piece of glass. Obviously, each pencil of light from the centre of the lens entering the base face of the prism 16 is small and increases in width by the time it emerges from the side face. On the other hand, the arrow 43 is considerably wider than such a pencil since it is drawn diagonally across the pencil. These features are brought out to aid in comparison with the effect, shown in Fig. 7, created by tilting the base face of the prism 68 in this case, through an angle A with respect to the principal planes of the lens 15. In this Fig. 7, the pencil of light corresponding to rays 23 of Fig. 4 strikes the base face of the prism 68 at an angle and is refracted as it enters the prism. Since the light in the bottom of each scene as represented by the bottom of the arrows travels only a short distance before reaching the side face at which it is reflected, it is deviated only slightly, whereas the rays traveling to the point of the arrows close to the optic axis of the lens are deviated considerably before striking the side face. This is indicated by the slope of the arrow 72 on the side face of the prism 68. Furthermore, after reflection, from this side face, the peculiar angle at which the rays strike the side face causes them to emerge from the opposite side face from points represented by the arrow 71 considerably displaced from the arrow 72 and from the optic axis of the lens 15. These emerging rays strike the outer reflectors 65 as indicated by the arrows 70 and are projected forward as indicated by arrows 69 and rays 66 and 67. All of this optical system is, of course, mainly intended for use in a camera rather than a projector, hence, the actual direction of the light rays is from the arrow 69 to the arrow 70, to the arrow 71, to the arrow 72, and thence to the film plane 18. This particular embodiment of the invention has several advantages and is described in detail in my copending application, Serial Number 394,677 referred to above now U. S. Patent 2,313,561.

In all of these embodiments of the invention the prisms need not have the base face parallel to the apex except, of course, in those cases where both are parallel to the principal planes of the lens 15. However, since commercially available prisms all do have the base face parallel to the apex, only such arrangements are described here and the advantages to be gained by having a slightly different angle are not considered in detail. It is pointed out, however, that, for example, in Fig. 7, proper selection of the angle A and of a different angle between the principal planes of the lens and the apex of the prism 68 could be employed to eliminate color fringing if such effects became intolerable.

In addition to the arrangement shown in Fig. 5 for providing an additional mirror in the optical system, there are illustrated in Figs. 8 and 9 two other positions which the mirror might occupy. In Fig. 8 the mirror 98 is placed between the prism 16 and the outer reflectors 40. With this arrangement the ray between the front focus plane of the lens 15 and the reflectors 40 corresponding to the optic axis of the lens is shown by the horizontal line 96 and is the lowest ray of the beam, the upper portion of which is represented by the line 95. In such case the optic axis of the view finder 97 should be tipped slightly upward so as to be parallel to the middle ray of the beam. Fig. 5 has the disadvantage of requiring a very large prism 16 and large mirrors 40. Fig. 8 has the disadvantage of requiring the mirror 98 to be very large and the mirrors 40 to be spaced more than the interocular separation or alternatively the disadvantage of being able to cover only a very narrow angle.

The preferable arrangement of an additional mirror is shown in Fig. 9 which corresponds exactly to Fig. 6 except that the optic axis of the lens 15 is held horizontally and the mirrors 40 are oriented to project the beam in a general upward direction wherein it strikes the mirror 100 and is projected horizontally forward. That is, the ray 60 corresponding to the optic axis of the lens 15 is projected horizontally forward as shown by the ray 102. The image shown by arrow 104 occupies the space below the ray 102, the lower portion of the beam being shown by ray 103. In front of the mirror 100 is provided a mask 101 which may be adjustable to correspond to different lens apertures and which masks from each of the beams any portions which would cause the beams to overlap at the back focus plane 18 of the lens 15. If the mask were positionable at the front focus of the lens, i. e. at the subject or screen, it would not have to be adjustable, but since it is near the lens and acts as a vignetting screen it must be adjustable to take care of the variation in vignetting with lens aperture.

In Figs. 10 and 11 this preferred embodiment of the invention is shown as an attachment which can be interchangeably used on a motion picture camera 104 or a motion picture projector 106. In each of these figures, half of the attachment is cut away for the sake of clarity. Since the lens 105 of the motion picture camera 104 in general has a different aperture from the lens 107 of the projector 106, the mask 101 on the front window of the attachment is hingedly mounted so as to be adjustable. Alternatively it could be mounted with pin and slot coupling to the housing as shown in Fig. 1. We have found that using a 2-inch lens 107 on the projector 106, that the two beams projected from the mirrors 40 upward to the mirror 100 and outward through the front window of the housing of the attachment, do not start to overlap until they pass beyond this front window. Therefore, the complementary light filters which are used to distinguish between the two beams may conveniently be placed in grooves 109 in the front window, as shown by the filter 108 in Fig. 11. When the attachment is used on a camera, no such filters are needed and hence the optical distance between the grooves 109 and the lens is of no importance. Of course, if shorter focal length lenses were used on the projector, it would be necessary to have the filters somewhat nearer the mirrors 40. The filters may be placed in the optical system anywhere between the prism 16 and the plane at which the outgoing beams overlap.

If the equilateral prism 16 is replaced by an isosceles prism, the base angles of the prism cannot be too small or the beams reflected from one side face of the prism to the other side face of the prism would not emerge but would be totally internally reflected back to the base face of the prism. However, the effect of this is mainly to restrict the angle of coverage of the system since rays to the lens strike the side faces at various angles. In Figs. 12 and 13 there are shown prisms which differ slightly from purely equilateral prisms and which would work satisfactorily except for color fringing. In Fig. 12, the vertex angle A is less than 60° and the base angles represented by the letter B, of the prism 116 are greater than 60°. Hence, light coming through the lens 115 is reflected up more than is necessary and instead of the pure block of glass effect of the prism, the base face and the side face at which the light emerges are optically wedged with respect to one another. To overcome any color fringing, thin wedges 117 having vertex angles C are placed on either side of the vertex A. Obviously, the angle B equals 90° minus one-half of the angle A. The angle C should equal 90° minus three halves the angle A.

Similarly in Fig. 13, a prism 118 is employed in which compensating wedges 119 have vertex angles F equal to three halves of the apex angle D minus 90°. In this case, the angle D is greater than 60° but as before the angle E equals 90° minus one-half the angle D.

Of all the different embodiments of my invention thus described, the most preferred one is that shown in Figs. 10 and 11. This preferred species is described generically in connection with Fig. 4. A second species which has several advantages of its own is that shown in Fig. 1.

In addition to the form of our invention described in our copending application, Serial Number 394,677 mentioned repeatedly above, attention is also directed to our copending application, Serial Number 394,678 filed concurrently herewith which refers to a stereoscope for viewing the oppositiaxially oriented pictures directly now U. S. Patents 2,313,561 and 2,313,562 respectively.

Having thus described the various embodiments of our invention, we wish to point out that it is not limited to these specific structures but is of the scope of the appended claims.

What we claim and desire to secure by Letters Patent of the United States is:

1. An optical system for projecting from or taking stereoscopic pictures adjacent to one another and oriented oppositiaxially on a film which system comprises an objective lens, means for holding the film in the back focus plane of the lens, an isosceles prism in front of the lens with the base face of the prism adjacent to the lens and with the opposite side faces oriented to reflect across each other and respectively through the other of the opposite side faces two separate and distinct light beams adjacent to each other at said back focus plane, crossing in the lens and passing through the base face of the prism and two reflectors positioned on opposite sides of the prism to intercept the beams and oriented to rotate the beams through 90° in opposite directions and to reflect them into stereoscopic coincidence at the front focus of the lens.

2. An optical system according to claim 1 in which the prism is an equilateral prism.

3. An optical system according to claim 1 in which the apex of the prism is coplanar with the line of division between the pictures when the film is in said back focus plane whereby the two light beams correspond respectively to the two pictures and in which a single mask is mounted in front of the reflectors to prevent overlap of the beams at said back focus plane.

4. A stereoscopic attachment for a camera or projector having an objective lens, which attachment comprises a housing with a window in the front wall and a second window in a different wall, an isosceles prism mounted in the housing with its base face adjacent to the second window, means on the housing for attaching it to the camera or projector with the prism and second window adjacent to and in alignment with the lens, the base face of the prism covering substantially all of the lens and the opposite side faces being oriented to reflect across each other and respectively through the other of the opposite side faces two separate and distinct light beams crossing in the lens and passing through the base face of the prism and two reflectors positioned on opposite sides of the prism to intercept the beams and oriented to rotate the beams through 90° in opposite directions and to reflect them into stereoscopic coincidence at the front focus of the lens.

5. A stereoscopic attachment according to claim 4 in which a single mask is mounted in front of the reflectors to prevent overlap of the beams at the back focus of the lens and is adjustable to correspond to different lens apertures.

6. A stereoscopic attachment for a camera according to claim 4 in which a view finder is centrally mounted on the housing above the prism with its axis substantially parallel to the center ray of each of the two light beams reflected to the front focus of the lens.

7. An optical system according to claim 1 in which said base face is orthogonal to the optic axis of the lens.

8. An attachment according to claim 4 in which the attaching means holds said base face orthogonal to the optic axis of the lens.

9. An optical system according to claim 1 in which an additional reflector is mounted in front of said two reflectors for identically reflecting both beams.

10. An attachment according to claim 4 in which an additional mirror is mounted between the front window and said two reflectors for identically reflecting the beams from said reflectors through the front window.

11. An optical system for projecting from stereoscopic pictures according to claim 1 in which complementary light filters are respectively mounted in the light beams between the prism and the plane in front of the reflectors where the beams first overlap.

12. A stereoscopic attachment alternatively for a camera and a projector each having an objective lens with its optic axis horizontal comprising a housing with a front and a rear window, an isosceles prism mounted in the housing with its apex vertical and its base face vertical and adjacent to the rear window, means on the housing for attaching it to a lens with the prism in alignment with the lens, the base face covering substantially all of the lens, two reflectors symmetrically mounted in the housing on opposite sides of the prism spaced apart the interocular distance and spaced from the prism respectively in directions perpendicular to the side faces of the prism said reflectors being oriented to rotate two separate and distinct light beams from the prism in opposite directions through 90° and to reflect the beams at a large angle to the horizontal and into stereoscopic coincidence at a distance approximately equal to the front focus of the lens and a third reflector in the path of both beams oriented to reflect them identically through the front window of the housing and to reflect them with those edges of the beams which pass through the centre of the base face and close to the apex of the prism, horizontal.

13. An attachment according to claim 12 having a horizontal mask in front of the third reflector forming one edge of the front window and limiting the two beams for preventing overlap thereof at the back focus of the lens and having said mask vertically adjustable to correspond to different lens apertures.

14. An attachment according to claim 12 having means in the housing for supporting complementary light filters respectively in the light beams between the prisms and the plane optically in front of said two reflectors where the two beams overlap.

POMPEY MAINARDI.
MARCUS N. MAINARDI.